United States Patent Office 2,879,150
Patented Mar. 24, 1959

2,879,150

METHOD OF DESTROYING UNDESIRED GRASS

George F. Deebel, Dayton, Ohio, and Philip C. Hamm, Webster Groves, Mo., assignors to Monsanto Chemical Company, St. Louis, Mo., a corporation of Delaware No Drawing. Application December 19, 1955
Serial No. 553,683

4 Claims. (Cl. 71—2.5)

The present invention relates to heterocyclic nitrogenous compounds and more particularly provides certain hitherto unknown alkyltrichloropyrimidines, the method of preparing the same, and herbicidal compositions comprising the new compounds as the active ingredients.

According to the invention there are provided new and valuable 5-alkyl-2,4,6-trichloropyrimidines by the reaction of phosphoryl chloride with an appropriate 5-alkylbarbituric acid, substantially according to the scheme:

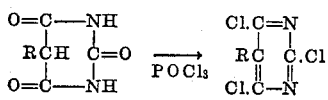

in which R is an alkyl radical of from 4 to 18 carbon atoms.

Examples of the presently provided compounds are 5-n-butyl-, tert-butyl-, n-amyl-, isoamyl-, n-hexyl-, 2-ethylbutyl-, n-heptyl-, n-octyl-, 2-ethylhexyl-, 2-n-propylheptyl-, n-nonyl-, n-decyl, n-undecyl-, tert-dodecyl-, n-dodecyl-, 2,6,8-trimethylnonyl-, 2-ethyl-octyl-, n-tridecyl-, n-tetradecyl-, n-hexadecyl- and n-octadecyl-2,4,6-trichloropyrimidines. The branched alkyl radicals may be derived from alkyl halides prepared from "Oxo" process alcohols (obtained by high pressure reaction of an olefin polymer with carbon monoxide and hydrogen).

5-alkylbarbituric acids employed for the preparation of the present 5-alkyl-2,4,6-trichloropyrimidines are readily available compounds which are obtained in known manner by the reaction of urea with an ester, say, the ethyl ester, of an appropriate alkylmalonic acid or by the condensation of barbituric acid with an appropriate aldehyde in the presence of hydrogen at superatmospheric pressure.

Reaction of the alkylbarbituric acid with the phosphoryl chloride is effected by heating a mixture of the two reactants, say, at temperatures of from 50° C. to 200° C., until conversion of the alkylbarbituric acid to the alkyltrichloropyrimidine has taken place. Depending upon the nature of the individual alkylbarbituric acid, the reactant quantities and the reaction temperature, conversion to the alkyltrichloropyrimidine will occur within a time of, say, a few minutes to a day. Advantageously the reaction is effected in the presence of a catalyst, e. g., an organic base such as pyridine, trimethylamine, dimethylaniline, etc. However, a catalyst need not be employed. An inert solvent or diluent may or may not be used. Since the reaction proceeds through intermediate formation of a hexachloro compound (by replacement of each keto oxygen of the alkylbarbituric acid with two chlorines) and subsequent dehydrochlorination to the trichloropyrimidine compound, there should be present at least two moles of phosphoryl chloride per mole of alkylbarbituric acid in order to obtain complete utilization of all of the latter. An excess of phosphoryl chloride is advantageous in that it serves as a diluent while assuring a sufficiency of chlorine. However, either reactant may be present in excess of the stoichiometrically required quantities, since unreacted starting material is readily removed from the solvent at the end of the reaction, e.g., by distillation or solvent extraction.

The present 5-alkyl-2,4,6-trichloropyrimidines are stable, well-defined compounds which range from viscous liquids to waxy and crystalline solids. They are advantageously employed for a variety of commercial and biological purposes, e.g., as rubber additives, fire-retardants and fungicides, but they are particularly valuable as herbicides. Depending upon the concentrations at which they are employed they have the property of either killing all plant growth or suppressing the growth of some plants while not affecting the growth of others, i.e., they are useful as the effective ingredients of either general or selective herbicides. The selectivity which is demonstrated at low concentrations of the present 5-alkyl-2,4,6-trichloropyrimidines is remarkable in that they adversely affect some narrow-leafed plants while not affecting others. In prior art selectivity of action was evidenced generally only between the effect of a herbicide on broad-leaf plants on one hand versus narrow-leaf plants on the other. The present herbicidal materials thus offer a means of eradicating undesirable grasses, e.g., crab grass and brome grass while not adversely affecting the growth of the desirable lawn grasses.

The present 5-alkyl-2,4,6-trichloropyrimidines may be applied as herbicides by any suitable method, for example, as sprays or as dusts. When used as sprays they may be employed in solution or in emulsion form. We have found that oil-in-water emulsions of the present compounds possess an improved tendency to adhere to plant foliage and that less of the pyrimidine compound is required to give comparable herbicidal effect. The emulsions are readily prepared by first preparing a solution of the complex in an organic solvent and then adding the resulting solution to water containing an emulsifying agent to form an emulsion. Emulsifying agents which may be employed are those customarily used in the art for the preparation of oil-in-water emulsions. The word "oil" is used here to designate any liquid which is insoluble in water. Examples of emulsifying agents which may be used include alkyl benzene sulfonates, long chained polyalkylene glycols, long chained alkylsulfosuccinates, etc.

The present invention is further illustrated, but not limited, by the following examples:

*Example 1*

A mixture consisting of 90 g. (0.375 mole) of n-octylbarbituric acid and 472 g. (3.1 moles) of phosphoryl chloride was charged to a 1-liter flask equipped with stirrer, thermometer, condenser and moisture seal to the atmosphere. Stirring was started and 80 ml. of dimethylaniline was added in a thin stream, whereby the temperature rose to 65° C. After refluxing the whole for 2 hours the excess phosphoryl chloride was removed from the reaction mixture by distillation under reduced pressure. The residue was allowed to cool to room temperature, 300 ml. of ether was added, and the whole was poured into ice water. Separation of the resulting ether layer, extraction of the aqueous layer with ether and washing of the combined ether layer and extract first with distilled water and then with brine gave a crude product from which water was removed by drying over calcium sulfate (Drierite) and the ether by distillation at atmospheric pressure. Further distillation at reduced pressure gave 49 g. of the substantially pure 2,4,6-trichloro-5-n-octylpyrimidine. B.P. 139–143° C/0.50–0.55 mm., $n_D^{25}$ 1.5150–1.5178 analyzing 35.54% chlorine as against 36.2%, the calculated value. An additional 12 g. of the trichlorooctylpyrimidine was obtained by fractionating the forerun, i.e., the ether which had been removed by distillation at atmospheric pressure.

*Example 2*

To a one-liter, 3-neck flask equipped with stirrer, reflux condenser and heating mantle there was charged 41.5 g. of 5-n-dodecylbarbituric acid, 150 ml. of phosphoryl chloride and 6 ml. of dimethylaniline. The whole was refluxed for 8 hours and unreacted phosphoryl chloride was removed from the resulting reaction mixture by distillation under water-aspirator vacuum. The residue was poured into a mixture of ice water and carbon tetrachloride. The resulting aqueous layer was discarded. After washing the organic layer until neutral, first employing brine and then aqueous sodium bicarbonate, it was filtered and the carbon tetrachloride removed from the filtrate by distillation at reduced pressure. The residue was taken up in ether and the small quantity (5.6 g.) of a viscous solid, probably dimethylaniline, was separated. The remaining ether solution was distilled to give 17.4 g. of the substantially pure 2,4,6-trichloro-5-n-dodecylpyrimidine, B.P. 150–152° C./0.075–0.16 mm., $n_D^{25}$ 1.5092, analyzing 29.44% chlorine as against 30.03% the calculated value.

*Example 3*

Employing the reaction equipment described in Example 2 a mixture consisting of 36 g. of 5-n-butylbarbituric acid, 150 ml. of phosphoryl chloride and 1 ml. of dimethylaniline was refluxed for 8 hours and then allowed to stand at room temperature overnight. Unreacted phosphoryl chloride was removed from the resulting reaction mixture by distillation and the residue was poured into a mixture of ice water and carbon tetrachloride. The organic layer which formed was separated and washed with water, aqueous sodium bicarbonate and finally again with water. Carbon tetrachloride was removed from the washed product by distillation and the residue was extracted with ether. The ether extract was filtered and distilled to give the substantially pure 2,4,6-trichloro-5-n-butylpyrimidine, B.P. 84–89.5° C./0.1 mm., $n_D^{25}$ 1.5375 analyzing 43.32% chlorine as against 44.5% the calculated value.

*Example 4*

This example describes herbicidal testing of the 2,4,6-trichloro-5-n-octylpyrimidine of Example 1. Flats containing two week-old plants of wild oats, brome grass, rye grass, buckwheat, radish, red clover, beet sugar, cotton, cucumber, corn, foxtail and portulaca as well as Black Valentine bean plants having one mature tri-foliate and one partially open tri-foliate were employed for the testing. An emulsion spray of trichlorooctylpyrimidine was prepared by first dissolving it in acetone forming a 2% stock solution. 0.3 millimeter of cyclohexanone and 3 drops (approximately 0.2 ml.) of an emulsifying agent were then added to a 5 cc. aliquot of the acetone stock solution. The emulsifying agent which was used was a mixture of a higher alkylbenzenesulfonate and a polyethyleneglycol derivative. The resulting solution was then diluted with water to a volume of 20 ml. (0.5% solution) forming a relatively stable emulsion of the pyrimidine compound.

Two flats were sprayed to run-off with the emulsion and one flat was employed as a "blank." All three flats were then placed in the greenhouse under ordinary conditions of sunlight and watering for 10 days. Observation of the plants at the end of this time showed all of the plants in the "blank" flat to be flourishing. In the sprayed flats all of the broad-leaf plants were either killed or severely injured. Of the narrow-leaf plants corn was severely injured and wild oat and brome grass were killed. Rye grass, on the other hand, had been affected only so slightly that within a short time its condition was the same as that of the rye grass in the "blank" pan.

*Example 5*

This example shows larger scale tests of the 2,4,6-trichloro-5-n-octylpyrimidine of Example 1 against grasses. A 20% solution of the pyrimidine compound in an aliphatic hydrocarbon solvent known to the trade as "Shell E–407" was prepared and this solvent and an emulsifying agent was added to water to give an emulsion which when applied at the rate of 200 gallons per acre would be equivalent to the application of 7 lbs. of the pyrimidine per acre of the grasses. The emulsifying agent which was used was a mixture of a polyalkylene glycol ether of an alkyl phenol and an alkenyl-substituted diethylene triamine. Using the emulsion as a spray on a greenhouse test plot planted to young blue grass and crab grass (seedlings to the 4th leave stage) and observation of the sprayed field at the end of two days showed the crab grass to be withered and "burned" while the blue grass was substantially unharmed. In tests on a lawn plot of an emulsion which was similarly prepared but which contained a quantity of the trichlorooctylpyrimidine equivalent to 25 lbs. of the pyrimidine compound when applied at the rate of 200 gallons of emulsion per acre substantially the same results were obtained.

While the present 2,4,6-trichloro-n-alkylpyrimidines are most advantageously employed as herbicides by incorporating them into an oil-in-water emulsion as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. They may also be mixed with liquid or solid agricultural pesticides, e.g., insecticides and fungicides. While solutions of the present compounds in organic solvents may be employed for preventing and destroying plant growth, we have found that the emulsions possess an improved tendency to adhere to the treated surfaces and that less of the active ingredients is required to give comparable herbicidal efficiency.

What we claim is:

1. The method of destroying undesired plants which comprises applying to said plants a toxic quantity of a herbicidal composition comprising as the essential active ingredient a 5-n-alkyl-2,4,6-trichloropyrimidine having from 4 to 18 carbon atoms in the alkyl radical.

2. The method of destroying undesired plants which comprises applying to said plants a toxic quantity of a herbicidal composition comprising 5-n-octyl-2,4,6-trichloropyrimidine as the essential active ingredient.

3. The method of destroying undesired grasses while substantially unaffecting the growth of desirable grasses which comprises applying to fields planted to both of said types of grasses an oil-in-water emulsion of a 5-alkyl-2,4,6-trichloropyrimidine having from 4 to 18 carbon atoms in the alkyl radical, said alkyltrichloropyrimidine being present in said emulsion in a quantity which is toxic to the undesired grasses.

4. The method which comprises destroying undesired grasses while substantially unaffecting the growth of desirable grasses which comprises applying to fields planted to both types of said grasses an oil-in-water emulsion of 5-n-octyl-2,4,6-trichloropyrimidine in a quantity which is toxic to the undesirable grasses.

References Cited in the file of this patent

UNITED STATES PATENTS 2,735,225    Goodhue et al. _____ Feb. 21, 1956

OTHER REFERENCES

Berichte der Deutsche Chem. Gesell., vol. 52, pp. 869–80 (1919).

Dox: J. Am. Chem. Soc., vol. 53, pp. 1559–66 (1931).

Hendry et al.: "Chemical Society Journal," London, January-March 1952, pages 328–33.